(12) United States Patent
Waffenschmidt

(10) Patent No.: US 6,573,472 B1
(45) Date of Patent: Jun. 3, 2003

(54) LASER WELDING DEVICE

(75) Inventor: Heinrich Waffenschmidt, Stein (DE)

(73) Assignee: Framatome Connectors International, Courbevoie (FR)

(*) Notice: Subject to any disclaimer, the term of this patent is extended or adjusted under 35 U.S.C. 154(b) by 161 days.

(21) Appl. No.: 09/645,736

(22) Filed: Aug. 24, 2000

(30) Foreign Application Priority Data

Aug. 25, 1999 (DE) .......................................... 199 40 208

(51) Int. Cl.$^7$ ......................... B23K 26/00; B23K 26/02; B23K 26/08
(52) U.S. Cl. ............................ 219/121.63; 219/121.64; 219/121.65; 219/121.7; 219/121.78; 219/121.85
(58) Field of Search ....................... 219/121.63, 121.64, 219/121.65, 121.67, 121.7, 121.78, 121.85

(56) References Cited

U.S. PATENT DOCUMENTS

| 4,992,025 | A | * | 2/1991 | Stroud et al. | ................ | 415/115 |
|---|---|---|---|---|---|---|
| 5,053,601 | A | | 10/1991 | Landtwing et al. | .... | 219/121.63 |
| 5,059,759 | A | * | 10/1991 | Kudo et al. | ............ | 219/121.78 |
| 6,130,970 | A | * | 10/2000 | Hong et al. | | |
| 6,141,476 | A | * | 10/2000 | Matsuura et al. | | |
| 6,229,940 | B1 | * | 5/2001 | Rice et al. | | |

FOREIGN PATENT DOCUMENTS

DE     3826670 C2    2/1990

OTHER PUBLICATIONS

Metals Handbook Ninth Edition, vol. 6, "Laser Beam Welding", pp. 647–671, copyright 1983.*

* cited by examiner

*Primary Examiner*—Tom Dunn
*Assistant Examiner*—Colleen P. Cooke
(74) *Attorney, Agent, or Firm*—Perman & Green, LLP

(57) ABSTRACT

A laser welding device for metal parts with a laser mounting (21), a lens system (27), and a table (20). The laser is mounted to the laser mounting (21). The lens systems (27) focuses the laser beam (41) on a focus (29). The table (20) holds the metal part to be welded. The laser beam (41) impinges on the metal part at an acute angle θ especially on the shoulder of a flat contact plug (1).

2 Claims, 2 Drawing Sheets

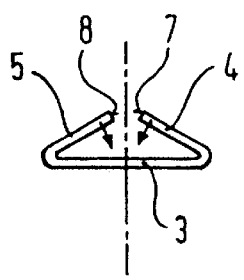
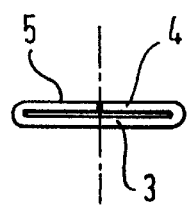
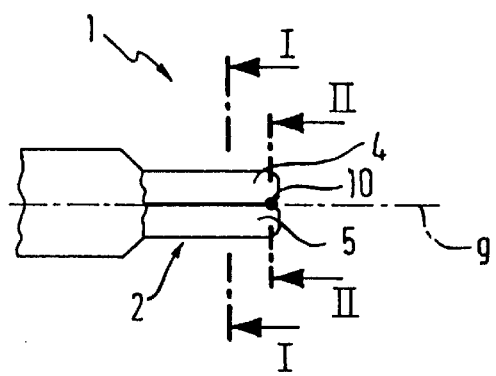
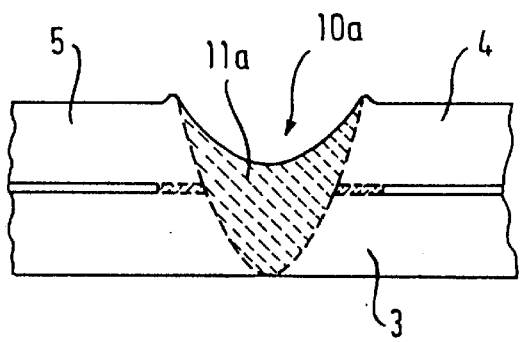
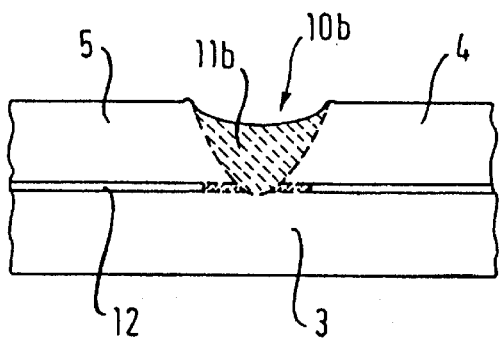

LASER WELDING DEVICE

BACKGROUND OF THE INVENTION

1. Field of the Invention

The invention relates to a laser welding device for metal parts, in particular for flat contact plugs according to the preamble statement of claim 1, a process and a device for the manufacture of flat contact strip according to the preamble statement of claim 7 respectively of claim 8, as well as flat contact plugs according to the preamble statement of claim 9.

2. Description of the Prior Development

Such laser welding devices for metal parts are inter al, used for the automated manufacture of flat contact plugs formed from steel strip in order to connect links which are bent or folded together and which are subsequently to form the shoulders of such flat contact plugs in the area of the joint gap. Such a flat contact plug 1 which is shown in horizontal projection in FIG. 3 has a plug shoulder 2 which stretches in the direction of plug insertion and which consists of an underside base part and two side links 4, 5 bent together on the said base part. As can be seen from FIG. 2a which shows a section of the plug shoulder during the process of bending, both the links 4,5 which are formed onto the base part 3 are bent so far that their longitudinal edges 7,8 push against one another or form a joint gap which runs along the longitudinal axis 9. This condition is shown in section in FIG. 2b. The process of folding or the bending deformation of the links 4,5 did not hitherto yield an adequate permanence of shape, so that after numerous insertions and withdrawals of the flat contact plug, a separation of the folded links occurred.

In order to avoid these problems, the bent links 4,5 are at present being spot-welded with the help of a vertically directed laser beam, where the welding point 10 is placed centrally between the longitudinal edges 7,8 of the links 4,5 on the free end of the plug shoulder 2 (cf FIG. 3). For this welding procedure, the laser unit or a deflection reflector is arranged vertically over the plug shoulder to be welded. In order to avoid collision with the folding tool which also works vertically, certain minimum distances must be observed which give rise to problems of position and space. In addition, it is a drawback that the vertically-directed laser beam produces circular welding points 10 which do not ensure a firm connection of the link edges 3,4. Correspondingly, separations of the links can occur in flat contact plugs which have been manufactured in this way. The vertical arrangement of the laser unit or of the optical deflection reflectors also brings it about that the rising metal vapours formed in the process of welding deposit as a coating on the surfaces of the laser components and thereby adversely affect the penetration of light. This leads to a fall in the output of the laser and to the formation of correspondingly weaker welded joints, since in the course of time, the laser output is absorbed by the laser lens and ceases to be available for welding.

U.S. Pat. No. 5,053,601 discloses a laser beam device which is integrated into a stamping device for metal parts. The laser unit is located at the side above the stamping device and the laser beam impinges sideways at an acute angle on the piece concerned. This known installation is however unsuitable for the manufacture of flat contact plugs and in particular for that of flat plug strips, since it possesses neither a means of folding or bending of side links nor a means of rhythmical movement.

SUMMARY OF THE INVENTION

It is the purpose of the invention to create a laser welding device which produces improved welded joints whilst needing less space and hardly at all soiling the lenses. This purpose is accomplished through the characteristics of the independent claims 1 and 8.

The invention has the further purpose of improving the process of manufacture of flat contact plugs in such a way that strong permanent welded joints are produced and after prolonged operating times and a high rate of insertions and withdrawals, the undesirable separation of the links is effectively prevented.

This purpose is accomplished by the use of the process steps contained in claim 7.

The laser welding device according to the invention can advantageously be integrated in compact stamping and folding installations such as those used in the mass production of flat contact plugs. Due to the angled direction of the laser beam, it is possible to position the laser unit sideways outside the mostly vertically moving stamping and folding tools and furthermore, metal vapours and other particulate contaminants which develop during the process of welding are prevented from depositing on the laser optical system. This ensures a constant laser output even over a prolonged period of use. Moreover, the laser unit can be optimally positioned in relation to the other manufacturing units which brings about an overall reduction in the size of the installation.

FIGS. 4a and 4b show a plug shoulder in II—II line section in FIG. 3; FIG. 4a shows a welding point 10a made according to the invention and FIG. 4b shows a welding point 10b made conventionally using a vertically directed laser beam. According to the state of the art, the melted welding point 11b of the welding point 10b only stretches as far as the link edges and only to the surface area of the base part 3, whereby a small amount of molten metal is forced into the air gap between the base part 3 and both the links 4,5. On the other hand, the welding point 10a shown in FIG. 4a and made using the laser welding device according to the invention, is substantially more stable since its substantially greater welding range 11a penetrates more deeply into the link edges and the base part 3 penetrates as far as the underside. The increased amount of molten material leads to a correspondingly increased strength of the welded joint. Moreover, the welding points are, in the case of assembly line or mass production, of permanently high quality since the optical components of the laser unit are not soiled by deposits of metal or other contaminants.

Advantageous embodiments and developments of the invention are set out in dependant Claims.

Preferred embodiment examples of the invention are explained individually in the schematic drawings:

BRIEF DESCRIPTION OF THE DRAWINGS

FIGS. 2a, 2b show a cross-section of a plug shoulder before and after the press folding of the links;

FIG. 3 shows in horizontal projection a part of a flat contact plug with its plug shoulder;

FIGS. 4a, 4b each show a plug shoulder along the II—II line section in FIG. 3 with a welding point (FIG. 4a) according to the invention and a welding point according to the state-of-the-art (FIG. 4b).

DETAILED DESCRIPTION OF THE INVENTION

Figure 1:
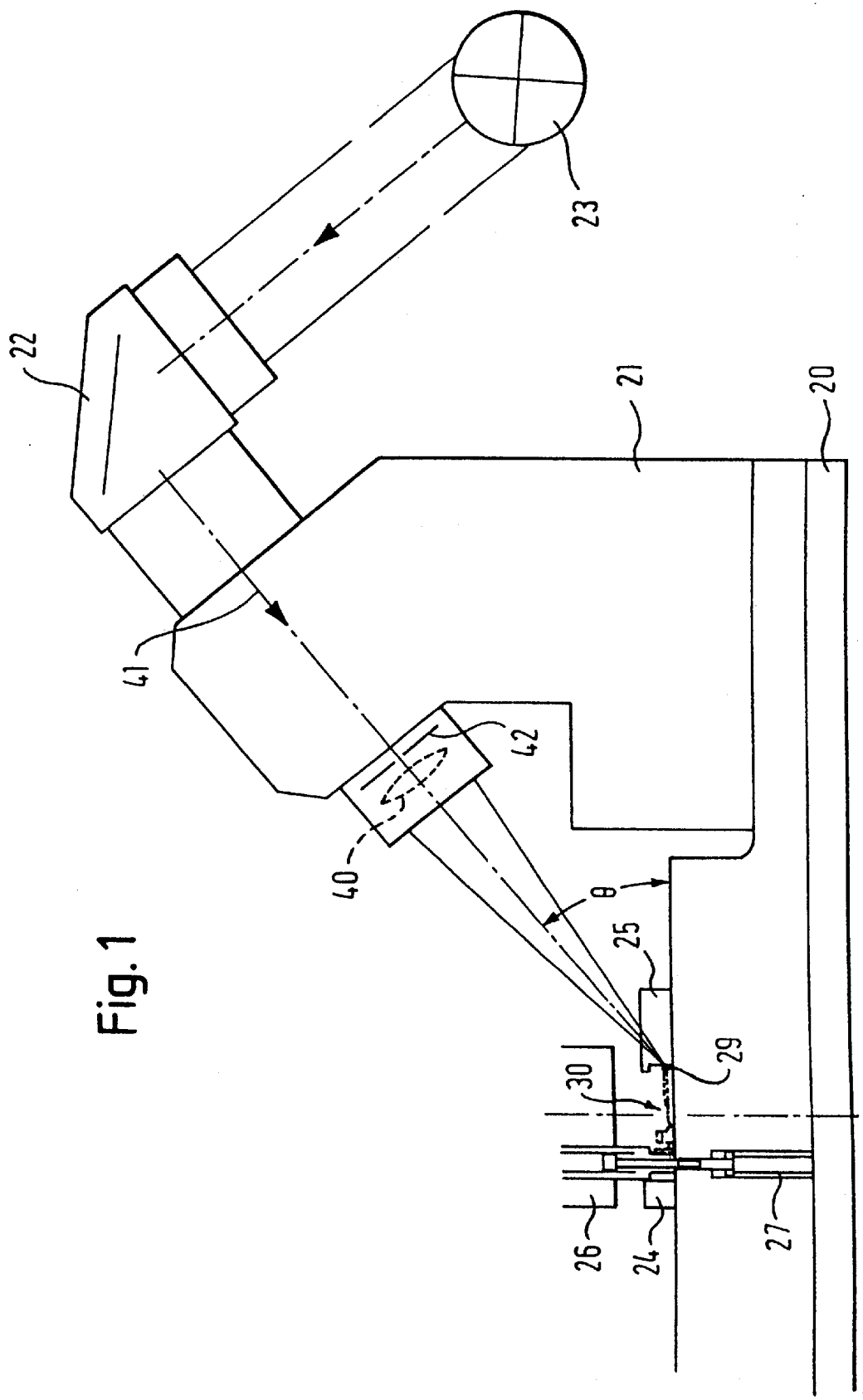
FIG. 1 shows a schematic side view of a laser welding device according to the invention.

The laser welding device shown in FIG. 1 comprises a table 20 on which a laser mounting 21 with an adjustable optical deflection component 22 is mounted and a laser 23. The laser mounting 1 is constructed in such a way that the laser beam 41 which passes from laser 23 through deflection component 22 and which is inclined by an angle θ impinges on the table top. Further, a screen 42 is arranged in the beam guide and will only allow the laser beam 41 to pass, if the metal part to be welded is located on the table in the focus of the laser beam. To the left next to the laser mounting are parallel guide rails 24, 25, between which a flat contact strip 30 is guided and is rhythmically advanced. Above and below the guide rails 24, 25 which stretch vertically to the plate level are arranged stamping and folding tools 26, 27. The longitudinal axes of the flat contact plug, each of which is connected to the side steel strip by a narrow bridge run parallel to the table plane and at right angles to the guide rails 24,25. The top of the plug shoulder 2 of the flat contact plug points to the laser beam mounting. This mounting also contains a lens system 40 which focuses the laser beam 41 on the farthest end of the plug shoulder. The laser beam substantially runs in a vertical plane parallel to the longitudinal axes g of the positioned flat contact plug 1. The laser beam 41 and the plane of the table top 20 subtend the acute angle θ which lies in the range 25° to 55° and has an optimum value of 45°.

The laser welding device shown in FIG. 1 is used in assembly line production of flat contact plugs, with blanks for individual flat contact plugs being continuously stamped from steel strip and subsequently steel strip parts are folded like the links 4,5 of the plug shoulder 2 on its underside by means of a press-bend process so that the free longitudinal edges 7,8 of the links 4,5 substantially push against one another in the longitudinal axis g of each flat contact plug. Next, the folded or press-bent links 4,5 are fastened to one another by means of a welding point 10 at the free end of the already formed plug shoulder 2.

For the carrying out of the various production processes, the metal strip is advanced stepwise through the processing stations between the guide rails 24, 25 through an exactly defined length and stopped for a short interval. A press carrying processing tool then passes over the metal strip and the individual press process steps are carried out on various flat contact plugs. The welding process on links 4,5 is only carried out when the flat metal contact strip is in its "stop" position. Only then does the laser beam arrive at the tip of the plug shoulder when it must be ensured that the focus 29 between links 4,5 is directed at the end of the plug shoulder 2. The slanting direction of the laser beam 41 brings it about that an elliptical welding point is formed on the tip of the plug shoulder and embraces a larger portion of the material to be welded than does a round welding point.

What is claimed is:

1. Process for the manufacture of a flat contact plug wherein steel sheet blanks with side links are stamped from the central portion of a strip, both the links of steel blank are bent over a continuous base part so that their free longitudinal edges touch the longitudinal axis of said flat contact plug and the longitudinal edges are welded together at the free end of said contact plug, using a laser welding device in such a way that an elliptical welding spot forms at the tip between the links; wherein the laser welding device has a laser mounting for fixing a laser, a lens system for focusing a laser beam on a focus point, and a table for fixing the metal part to be welded; wherein the laser beam is directed to impinge on the metal part at an acute angle θ on a shoulder of said flat contact plug.

2. Device for the manufacture of flat contact strip, the device including:

a stamping station for the stamping of steel blanks for flat contact plugs from the central part of a steel strip;

a folding station for bending links which are formed into the base part of a plug shoulder;

a laser welding station for the spot welding of both the bent links by means of a welding point which connects their longitudinal edges; and a transport installation for the rhythmic movement of the partly processed flat contact plug and the strip which is still connected to it by bridges wherein a laser beam impinges in a vertical plane of the joint gap of the folded links at an acute angle θ on both link edges at the free end of a plug shoulder and forms an elliptical welding spot whose melting range area embraces both the link edges and reaches through a base part of the plug shoulder.

* * * * *